US012724962B2

(12) United States Patent
Shin et al.

(10) Patent No.: US 12,724,962 B2
(45) Date of Patent: Sep. 1, 2026

(54) PRE-TRAINING LANGUAGE MODELS USING NATURAL LANGUAGE EXPRESSIONS EXTRACTED FROM STRUCTURED DATABASES

(71) Applicant: Nvidia Corporation, Santa Clara, CA (US)

(72) Inventors: Hoo Chang Shin, Mountain View, CA (US); Anas Zainul Abidin, Fair Lawn, NJ (US); Bo Liu, Short Hills, NJ (US); Carol Anderson, Lehi, UT (US); Virginia Adams, Sunnyvale, CA (US); Jonathan Cohen, Mountain View, CA (US)

(73) Assignee: Nvidia Corporation, Santa Clara, CA (US)

( * ) Notice: Subject to any disclaimer, the term of this patent is extended or adjusted under 35 U.S.C. 154(b) by 323 days.

(21) Appl. No.: 17/831,000

(22) Filed: Jun. 2, 2022

(65) Prior Publication Data

US 2023/0394232 A1 Dec. 7, 2023

(51) Int. Cl.

| | |
|---|---|
| ***G06F 40/20*** | (2020.01) |
| ***G06F 16/242*** | (2019.01) |
| ***G06F 16/25*** | (2019.01) |
| ***G06F 40/40*** | (2020.01) |

(52) U.S. Cl.

CPC ............ *G06F 40/20* (2020.01); *G06F 16/243* (2019.01); *G06F 16/258* (2019.01); *G06F 40/40* (2020.01)

(58) Field of Classification Search

CPC ......... G06F 40/20; G06F 40/40; G06F 16/243

See application file for complete search history.

(56) References Cited

U.S. PATENT DOCUMENTS

| | | | | |
|---|---|---|---|---|
| 2006/0173834 | A1 * | 8/2006 | Brill | G06F 16/248 |
| 2007/0078766 | A1 | 4/2007 | Appelt | |
| 2019/0340240 | A1 * | 11/2019 | Duta | G06V 30/15 |
| 2021/0026820 | A1 * | 1/2021 | Mahajan | G06F 16/316 |
| 2022/0318230 | A1 * | 10/2022 | Sikka | G06F 40/166 |
| 2022/0318669 | A1 * | 10/2022 | Alexander | G06N 3/0455 |
| 2022/0398272 | A1 * | 12/2022 | Sastry | G06F 16/86 |
| 2023/0139831 | A1 * | 5/2023 | Wang | G06V 30/1444<br>704/9 |
| 2023/0169101 | A1 * | 6/2023 | Yuan | G06N 3/045<br>707/722 |

FOREIGN PATENT DOCUMENTS

| | | |
|---|---|---|
| KR | 20210085113 A | 7/2021 |

OTHER PUBLICATIONS

Chinese Office Action issued in Application Serial No. 202211184294.9 dated Jun. 6, 2026.

* cited by examiner

*Primary Examiner* — Bryan S Blankenagel

(74) *Attorney, Agent, or Firm* — Hogan Lovells Cadwalader US LLP

(57) ABSTRACT

Systems and methods provide for training a language model on the relationships present in a structural database. Information within a structural data is processed and converted into plain text such that the relationships within the database, such as hierarchical relationships, relations, etc. are maintained and represented in a plain text format. This information may be used as training data for a language model to provide pre-training for one or more domains. The language model may then be leveraged with natural language searching in order to identify results within a search domain response to an input query.

20 Claims, 13 Drawing Sheets

Figures 3A, 3B:
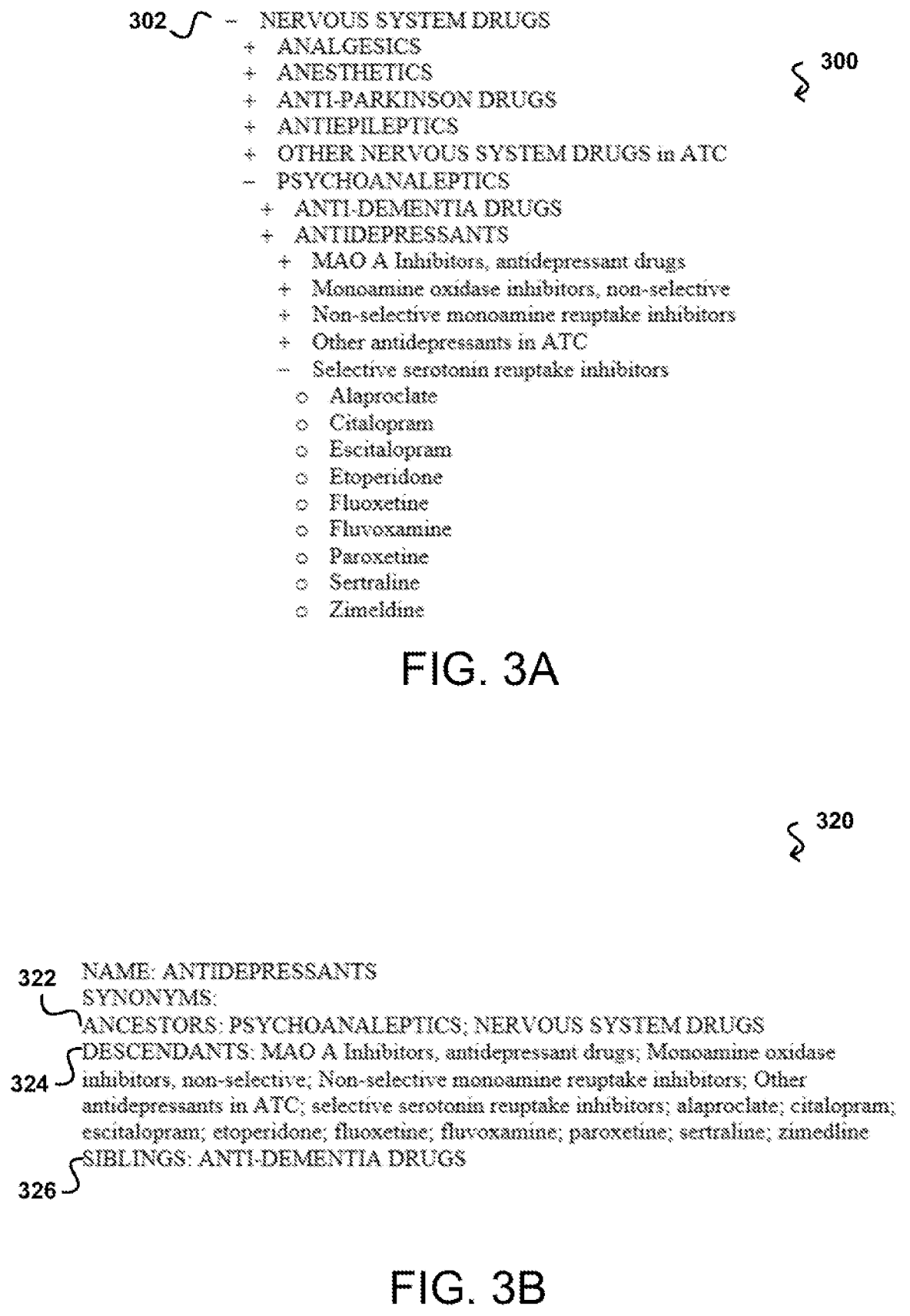

302 300

- NERVOUS SYSTEM DRUGS
  + ANALGESICS
  + ANESTHETICS
  + ANTI-PARKINSON DRUGS
  + ANTIEPILEPTICS
  + OTHER NERVOUS SYSTEM DRUGS in ATC
  - PSYCHOANALEPTICS
    + ANTI-DEMENTIA DRUGS
    + ANTIDEPRESSANTS
      + MAO A Inhibitors, antidepressant drugs
      + Monoamine oxidase inhibitors, non-selective
      + Non-selective monoamine reuptake inhibitors
      + Other antidepressants in ATC
      - Selective serotonin reuptake inhibitors
        - Alaproclate
        - Citalopram
        - Escitalopram
        - Etoperidone
        - Fluoxetine
        - Fluvoxamine
        - Paroxetine
        - Sertraline
        - Zimeldine

322 NAME: ANTIDEPRESSANTS
SYNONYMS:
ANCESTORS: PSYCHOANALEPTICS; NERVOUS SYSTEM DRUGS

324 DESCENDANTS: MAO A Inhibitors, antidepressant drugs; Monoamine oxidase inhibitors, non-selective; Non-selective monoamine reuptake inhibitors; Other antidepressants in ATC; selective serotonin reuptake inhibitors; alaproclate; citalopram; escitalopram; etoperidone; fluoxetine; fluvoxamine; paroxetine; sertraline; zimedline

326 SIBLINGS: ANTI-DEMENTIA DRUGS

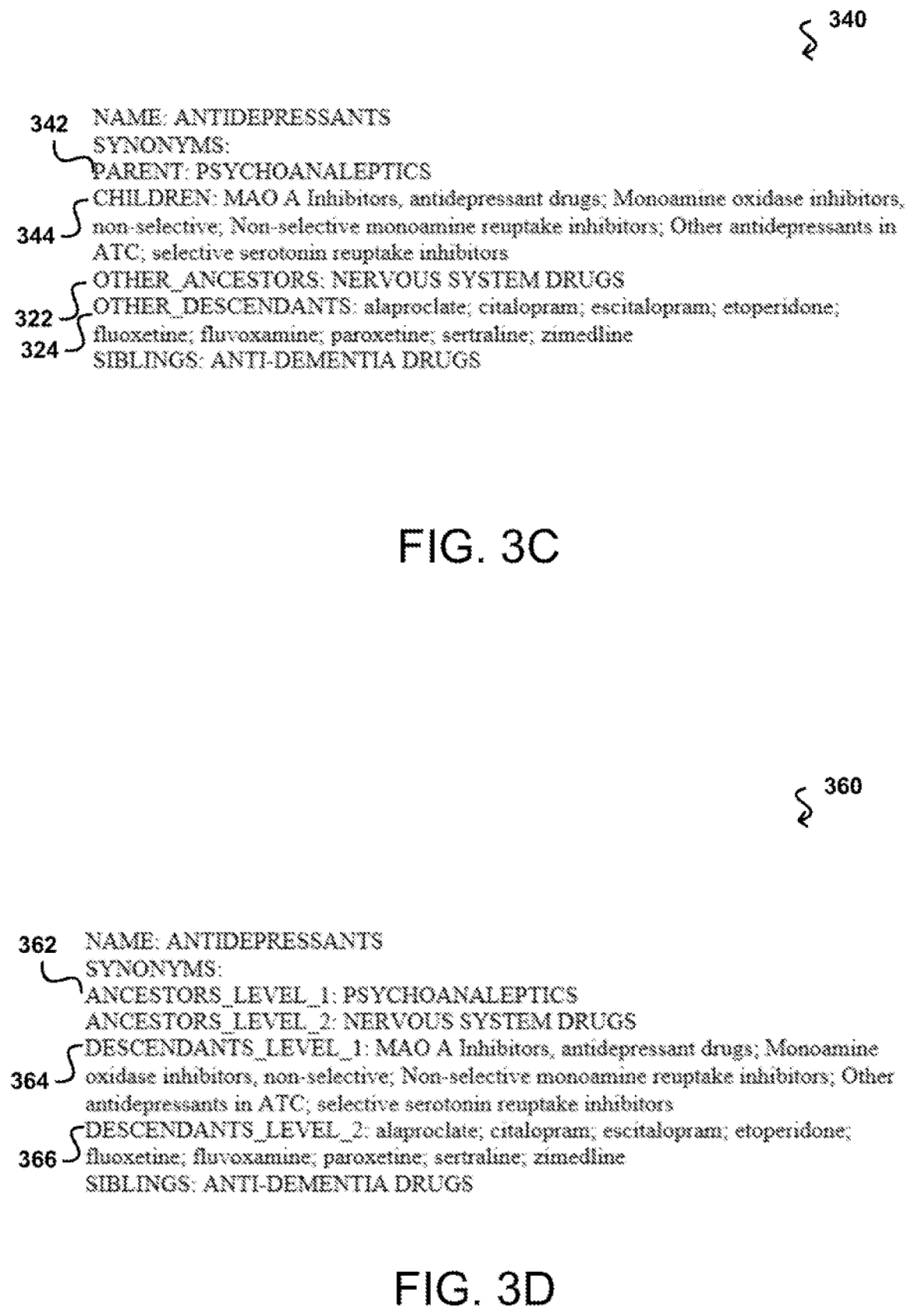

342 NAME: ANTIDEPRESSANTS
SYNONYMS:
PARENT: PSYCHOANALEPTICS
344 CHILDREN: MAO A Inhibitors, antidepressant drugs; Monoamine oxidase inhibitors, non-selective; Non-selective monoamine reuptake inhibitors; Other antidepressants in ATC; selective serotonin reuptake inhibitors
322 OTHER_ANCESTORS: NERVOUS SYSTEM DRUGS
324 OTHER_DESCENDANTS: alaproclate; citalopram; escitalopram; etoperidone; fluoxetine; fluvoxamine; paroxetine; sertraline; zimedline
SIBLINGS: ANTI-DEMENTIA DRUGS

362 NAME: ANTIDEPRESSANTS
SYNONYMS:
ANCESTORS_LEVEL_1: PSYCHOANALEPTICS
ANCESTORS_LEVEL_2: NERVOUS SYSTEM DRUGS
364 DESCENDANTS_LEVEL_1: MAO A Inhibitors, antidepressant drugs; Monoamine oxidase inhibitors, non-selective; Non-selective monoamine reuptake inhibitors; Other antidepressants in ATC; selective serotonin reuptake inhibitors
366 DESCENDANTS_LEVEL_2: alaproclate; citalopram; escitalopram; etoperidone; fluoxetine; fluvoxamine; paroxetine; sertraline; zimedline
SIBLINGS: ANTI-DEMENTIA DRUGS

FIG. 3D

Sertraline is a type of selective serotonin reuptake inhibitor.

Sertraline is a type of antidepressant.

Nervous system drugs include analgesics; anesthetics; anti-Parkinson drugs; antiepileptics; other nervous system drugs in ATC; and psychoanaleptics.

Anti-dementia drugs and antidepressants are both psychoanaleptics.

PRE-TRAINING LANGUAGE MODELS USING NATURAL LANGUAGE EXPRESSIONS EXTRACTED FROM STRUCTURED DATABASES

BACKGROUND

Various language models have been shown to be effective for tasks such as question answering, sentiment analysis, and summarization. These models are typically trained for a specific domain, either using very large datasets or human annotated datasets, and as a result may be difficult to scale. To acquire the functionality of these models, pre-training is often instituted in order to fine-tune models for a specific domain. However, novel searches or searches outside of the domain generally have poor results, thereby limiting the use of these models for new applications that do not have the necessary training data.

BRIEF DESCRIPTION OF THE DRAWINGS

Various embodiments in accordance with the present disclosure will be described with reference to the drawings, in which:

FIG. 3A illustrates an example dataset, according to at least one embodiment;

FIGS. 3B-3E illustrate example records, according to at least one embodiment;

DETAILED DESCRIPTION

Figure 1:
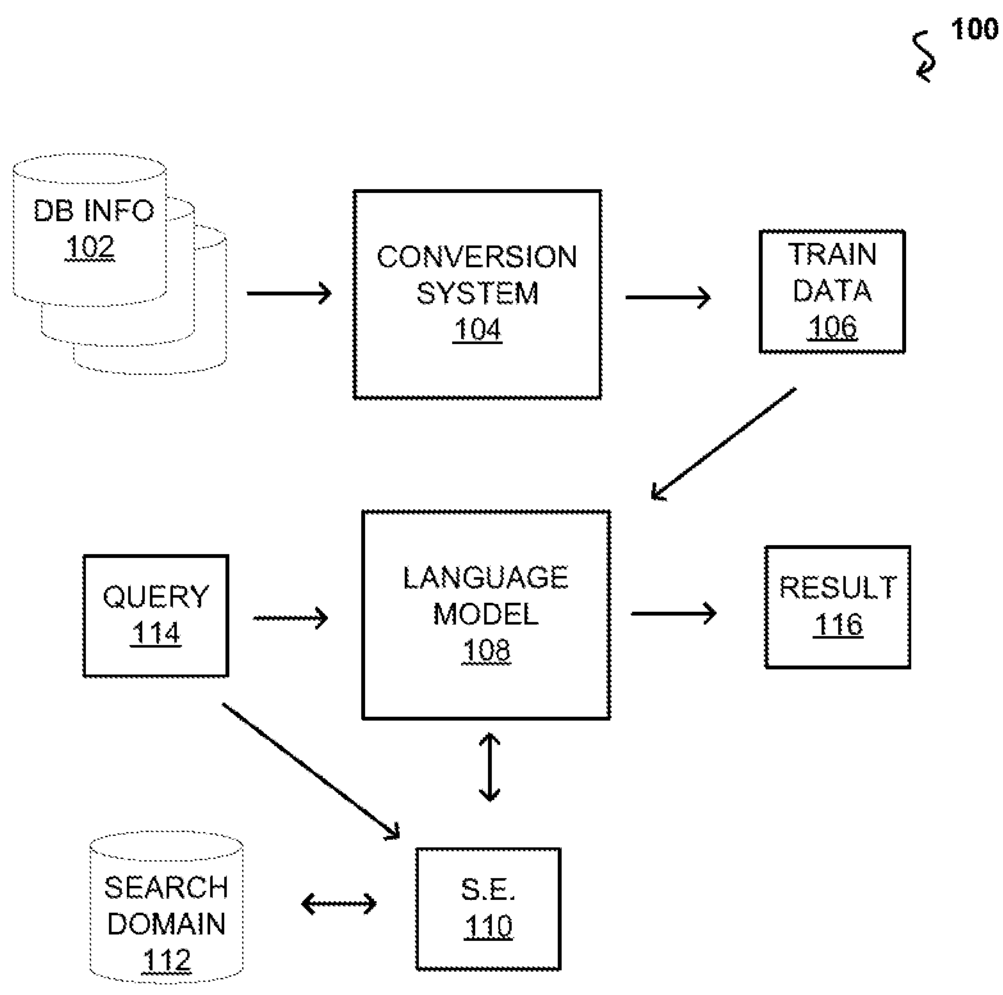
FIG. 1 illustrates an example training and query processing environment, according to at least one embodiment.

Approaches in accordance with various embodiments provide systems and methods for maintaining hierarchical and structural relationships within databases during plain text conversion for use with training learning models. As a result, improvements to search are enabled that facilitate identification of novel information from a corpus of data when compared to traditional semantic searching techniques. Various embodiments may overcome problems associated with traditional training methods that utilize a denoising objective to train one or more models. The denoising objective is limited, especially when trying to identify novel information, because it may ignore structural information present in the original data. This information may include significant work or annotation from human reviewers and is lost with traditional evaluation. Furthermore, systems and methods may also be expanded to more than text-like data and may utilize information stored in structured databases, such as relational databases. In this manner, structure may be preserved when information is converted to plain text for training purposes, which may enable pre-training of language models to benefit from those relationships, thereby providing improved search results when the language models are used.

Various embodiments enable novel findings using natural language searching without requiring the use of large, human annotated datasets. Furthermore, improvements to semantic searching may be provided by leveraging hierarchical or structural information associated with databases. Embodiments provide a language model that is pre-trained on converted plain text data. For example, the text data may be acquired from different structured or relational databases or data sources and processed to preserve that associated structure, while also being converted to plain text for training purposes. Pre-training the model on this information allows the model to learn hierarchies and relationships present in the original data. This language model may then be used to process information within one or more different domains and then provide responses to various input queries. In certain embodiments, converting the plain text data may be an automated process, such as a table-to-text conversion process, or may be specific for particular domains. In at least one embodiment, improvements in search results may be provided against in-domain text due to the improved training of the language model (e.g., training that includes complex—hierarchical, relations, intertwined, etc.). Accordingly, the language model may receive a query, understand the query, search through the in-domain information, and then find relevant items where typical search engines would fail.

Embodiments may further be directed toward generating text from one or more structural databases, such as a relational database, among other options. Systems and methods may include one or more automated processes that may receive, as an input, one or more portions of a database, and from that input, determine relationships between different components based, at least in part, on information within the database. By way of example, the database may group or otherwise categorize items (e.g., grouping by generations/ancestors, grouping by parent/child relationships, etc.). Various embodiments may evaluate these relationships and then generate one or more records associated with the relationships within the table, which may correspond to plain text information that may be useful for training purposes. As an example, a database may include information related to a class of pharmaceuticals, a method of action, and a list of compounds that drive that method of action. Upon evaluation, plain text information such as "Compound A is a type of A activator." or "Compound A is classified as a B pharmaceutical." may be generated. These relationships may then be utilized in pre-training a language model so that in-domain searching may be improved by leveraging the structural relationships also provided within the evaluated databases.

An environment 100 illustrates a process flow to maintain hierarchical structure within a database, such as a relational database among others, to train a language model to improve search results response to a query, as illustrated in FIG. 1. In this example, the environment 100 may be executed on one or more computer systems that include one or more processors and one or more memories. The computer systems may be part of a distributed computing environment (e.g., a cloud computing environment) where one or more systems of the environment 100 are hosted or otherwise executed on different systems. It should be appreciated that while various components may be illustrated as different modules or subsystems that various embodiments may incorporate one or more features of the various modules or subsystems into other associated modules or subsystems.

In at least one environment, an information set is associated with one or more databases 102. The information set may include data that may, in various embodiments, be formatted or stored in some type of hierarchical or relational fashion, such as a relational database, a table, or the like. The respective information sets associated with the databases 102 may include rich formatting that is prepared or otherwise designated by a human reviewer (e.g., to input the information into the information set) or by rules associated with the database software systems. As a result, the information within the databases may provide relational information that may be useful for one or more machine learning systems, such as language models. However, the format of these information sets may not be suitable for training the machine learning systems, and as a result, may be converted or otherwise modified to be used as training data. Much of the information may be lost when the databases are converted to text, and as a result, the information may be less useful. Systems and methods, as shown in FIG. 1, overcome this deficiency by utilizing a conversion system 104 that maintains the structural and hierarchical relationships established in the information sets while still converting the information sets into textual inputs that are useful for training purposes.

Various embodiments include the conversion system 104 that receives, as an input, the information sets from the databases 102 and then converts the information into text-based data that may be used as training data 106. In at least one embodiment, the conversion system 104 may correspond to a set of rules for analyzing the information that forms the input and then representing various hierarchical or structural relationships between the information. By way of example, if the input information is in the form of a collapsible list, where a first topic has various subtopics, the information may be represented in the form of groupings (e.g., ancestors, parents, siblings, etc.), by levels of the relationship to indicate separation, as a series of micro-records that are converted into lists or plaintext format, or combinations thereof, among other options. In this manner, the relationships and connections between various portions of the input data may be maintained, even after the conversion to plain text for use as the training data 106.

In at least one embodiment, one or more automated systems may be deployed within the conversion system 104 in order to receive the input data and convert the input data into the training data 106. For example, a table-to-text conversion application may be deployed in order to identify a table, recognize different headers within the table, group different components with the associated headers, and then present the data within the table in a plain text format. It should be appreciated that different utilities may be used for different types of input data, and in at least one embodiment, various formats may be determined prior to conversion. For example, one or more databases may be evaluated differently than other databases due to the information commonly presented or formatted within those databases. Accordingly, the system may be tuned or otherwise have a set of instructions to handling different types of input data. It should be appreciated that one or more embodiments may enable a customizable conversion utility where a user may hard code or otherwise specifically indicate how input data is to be evaluated and grouped.

In at least one embodiment, the training data 106 may be used to pre-train a language model 108. Various types of language models 108 may be utilized with embodiments of the present disclosure, including but not limited to, BERT, RoBERTa, and T5, among others. These language models 108 may be referred to as base language models that can be applicable for a large number of tasks and then may be specifically trained to specialized or otherwise focus on a particular domain. Traditionally, these types of models would use very large data sets to get sufficient training information for a particular domain, which may be difficult to acquire. Moreover, various embodiments may also utilize modifications to the model architecture in order to achieve desirable results. These problems are overcome using systems and methods of the present disclosure through the use of the training data 106 to pre-train the language model 108 on a particular domain, which may correspond to a domain associated with the databases 102. Because the training data 106 is formatted to maintain the hierarchical and relational information of the original data, more information is provided to the language model 108 for pre-training, thereby allowing improved results on a shorter timeline. Moreover, systems and methods may address the problems of traditional language models when it comes to identifying "novel" results from a search domain due to the lack of annotated training data or without a sufficient set of training data.

As previously indicated, traditional language models may be pre-trained on large corpuses of unannotated text using a denoising objective (e.g., a masking words within sentences and phrases). Unlike systems and methods of the present disclosure, these techniques ignore the structure of the input dataset. As a result, input data is limited to text-like data, such as web pages, books, articles, etc. However, additional information may be found in a variety of locations, such as structured or relational databases (e.g., SQL, XML, RRF). Various embodiments leverage the effort that has already been put into forming these databases by maintaining the structure and relations in the text. As a result, pre-training the language model 108 on this improved training data 106 provides improved results responsive to a query. In at least one embodiment, the query may be a natural language query with a search intent to find novel findings or relationships between different components.

In at least one embodiment, the language model 108 may be implemented to improve search results associated with traditional search engines 110 that execute against a search domain 112. For example, an input query 114 may be presented to either the language model 108 or to the search engine 110. The search engine 110 may leverage the language model 108 to provide improved results against the search domain 112 to generate a result 116, which may be a novel finding. Accordingly, systems and methods of the present disclosure may be used to conduct a search on a corpus of documents, web pages, etc. By leveraging the pre-trained language model 108, a series of novel findings (e.g., findings that would not be identified with traditional search) may be obtained because the language model 108 has a deeper knowledge of the search domain 112 due to the pre-training from the databases 102, which as noted above, may be related to the search domain 112.

Figure 2:
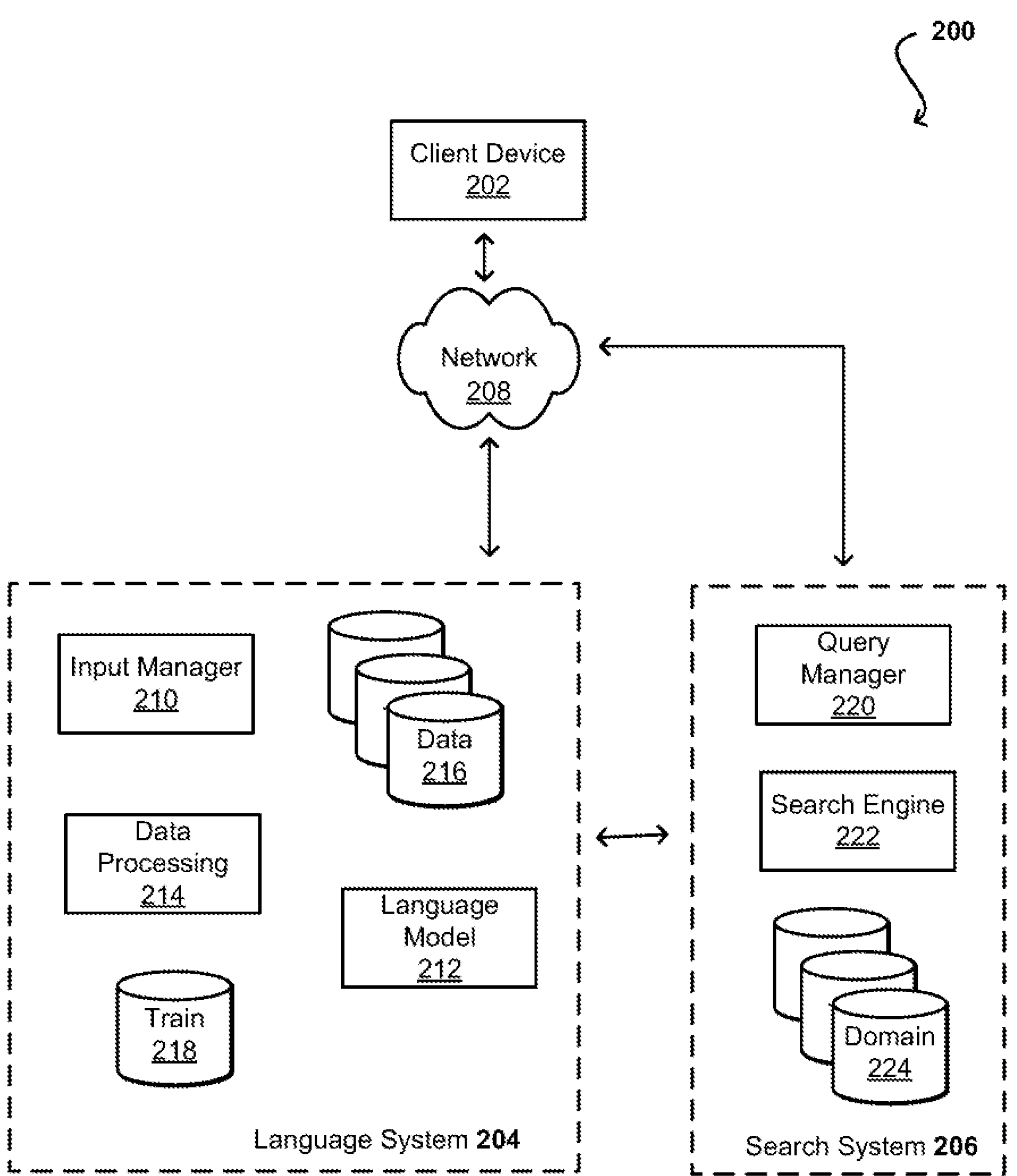
FIG. 2 illustrates an example search environment, according to at least one embodiment.

An environment 200 may be utilized with one or more language models, as shown in FIG. 2. It should be appreciated that the environment 200 may include more or fewer components and that various components of the environment 200 may be incorporated into singular systems, but may be shown as separate modules for convenience and clarity. In this example, a client device 202 may make one or more requests to a language system 204 or to a search system 206 via one or more networks 208. The networks 208 may be wired or wireless networks which include one or more intermediate systems, such as user devices, server components, switches, and the like. It should be appreciated that one or more of the language system 204 or the search system 206 may be associated with different providers and the language system 204 may be provided as a service to enhance or otherwise improve the functionality of the search system 206. Furthermore, in at least one embodiment, the search system 206 may be a subscription service that provides access to one or more records and the language system 204 may be used in order to improve searches. Additionally, in at least one embodiment, the language system 204 may be hosted by and/or managed by a common entity as the search system 206.

In this example, the client device 202 may make requests over the network 208, such as requests to train or update a language model, requests to develop a language model, search requests, or the like. For example, an input manager 210 may receive a request from the client device 202 associated with one or more changes or updates within the language system 204. The input manager 210 may process the request, determine whether the client device 202 is authorized to make such a request, and then proceed with fulfilling the request, if authorized and within the capabilities of the system. In at least one embodiment, the request is to develop a new domain in which to train a language model 212.

The input manager 210 may submit a command to a data processing unit 214 to convert information from one or more datasets 216 into text-based information that may be utilized to train the language model 212. For example, the datasets 216 may include various databases or other types of structured data that include hierarchical information that provides context and relationship information between different portions of the data, but may be lost when the data is converted into a text-based format. Embodiments of the present disclosure may preserve these relationships, thereby providing additional information for training of the language model 212. By way of example only, relationships may be converted into textual sentences, such as "Chemical A is a subclass of Medicine B." Such a relationship may be lost when traditionally converting information to a text-based format, such as information that is stored in a table or with submenus. However, various embodiments provide for the data processing unit 214 to preserve and maintain such relational information, thereby providing improved training data without the use of human annotations.

In various embodiments, the data processing unit 214 may acquire datasets 216 associated with one or more specific domains. For example, for medical applications, the domain may be directed toward pharmaceutical compound interactions or mechanisms of action. It should be appreciated that various different domains may be processed with training data stored in a training database 218. This information may then be provided as pre-training or fine tuning information to train the language model 212. As a result, the language model 212 may be trained on information that includes rich hierarchical and relational data without providing human reviewers to annotate and provide the information, thereby saving time and cost. Furthermore, a larger variety of domains can be rapidly evaluated and used to train the language model 212, thereby making associated applications, such as search, more nimble and suitable for rapid deployment.

In at least one embodiment, the language model 212 may be incorporated with or used to enhance the search system 206. It should be appreciated that this is provided as one example implementation and embodiments of the present disclosure are not limited to such an application. In this example, the search system 206 includes a query manager 220 that may receive and process an input query, such as a search query. In various embodiments, the input query is received from the client 202, from the language system 204, or combinations thereof. A search engine 222 may perform the search against a search domain 224. For example, the search engine 222 may be a product or service associated with a provider, such as a search system within a collection of journals or articles. Additionally, in various embodiments, the search engine 222 may be a broader search engine, such as one that aggregates and evaluates different websites or products available through an e-commerce platform. In this example, the search domain 224 associated with the input query may be substantially similar to or related to the domain which the language model 212 has been trained. Accordingly, improved search results may be achieved through the relationships maintained via the training data 218. In this manner, a user searching for novel findings may receive better results than using the search engine 222 alone, which may not have knowledge of the relationships maintained and learned at the language model 212. Moreover, the user may be able to craft more targeted searching by using natural language searching.

FIG. 3A illustrates a set 300 of source data that may be stored in one or more databases. In this example, the set 300 is in a hierarchical structure that illustrates relationships between different pharmaceuticals. The structure here is represented by a collapsible menu 302 that allows a user to sort through different types of pharmaceuticals. Typically, converting such an arrangement to be text based would lose this valuable hierarchical information and grouping of the set 300 because the links (e.g., the drop down portions) would be lost or would not be reflected as text upon conversion. However, embodiments of the present disclosure may be directed towards maintaining such relationships to provide improved training data that may be used to pre-train one or more language models to facilitate novel results from natural language search inputs, among other options.

FIG. 3B illustrates an example record 320 for the set 300 after being processed by one or more systems and methods of the present disclosure, such as the conversion system 104 and/or the data processing unit 214, among other options. In this example, different pharmaceuticals of the set 300 are grouped together as ancestors 322, descendants 324, and siblings 326. By way of example, the ancestors 322 are deemed as the PSYCHOANALEPTICS and NERVOUS SYSTEM DRUGS, as these two options can be traced back to where the drop down menu was open. The descendants 324 correspond to each of the pharmaceuticals that were part of the drop down menu from ANTIDEPRESSANTS. Moreover, the siblings 326 correspond to other categories that extend from the same lowest ancestor 322 (e.g., PSYCHOANALEPTICS).

The illustrated example record 320 may then be utilized as training data for one or more language models. For example, this information may be utilized to teach the language model that MAO A Inhibitors are a type of antidepressant within the class of psychoanaleptics. Moreover, related pharmaceuticals may also be identified, such as via evaluation of the descendants 326, which may then be used to identify potential alternatives in the event one or more cause an adverse reaction, as an example only.

FIG. 3C illustrates an example record 340 for the set 300 after being processed by one or more systems and methods of the present disclosure, such as the conversion system 104 and/or the data processing unit 214, among other options. In this example, different pharmaceuticals of the set 300 are grouped together to keep parents 342 and children 344 separate from more distance descendants 324 and ancestors 322. By way of example, the immediate parent PSYCHOANALEPTICS (e.g., the last drop menu that contains ANTIDEPRESSANTS) is separated from the other ancestor NERVOUS SYSTEM DRUGS when compared to FIG. 3B. Moreover, the children 344 correspond to the different categories below ANTIDEPRESSANTS, while other descendants 324 are further categorized as separate from the children. In this manner, the main classes of anti-depressants can be identified and specific compounds may be classified as the other descendants 324.

As noted above, the illustrated example record 340 may then be utilized as training data for one or more language models. For example, this information may be utilized to teach the language model specific classes of anti-depressants without grouping in the various specific compounds, as shown in FIG. 3B.

FIG. 3D illustrates an example record 360 for the set 300 after being processed by one or more systems and methods of the present disclosure, such as the conversion system 104 and/or the data processing unit 214, among other options. In this example, different pharmaceuticals of the set 300 are grouped together by their "level" when compared to the overall category (e.g., antidepressants). For example, level 1 ancestors 362 correspond to the parents of FIG. 3C, level 2 ancestors 364 corresponds to the children of FIG. 3C, level 1 descendants 366 correspond to the other descendants 324 of FIG. 3C, and so forth. Such a separation maintains the hierarchical structure of the set 300, specifically with respect to the drop menus, where the levels are indicated by how many levels are expanded with respect to the overall class being evaluated. For example, in this example, the ancestors travel upwards to the main category (e.g., antidepressants are a category of psychoanaleptics, which are a category of nervous system drugs) and descendants travel downwards from the class being evaluated. As noted above, the illustrated example record 360 may then be utilized as training data for one or more language models.

Figure 3E:
Figure 3E:

FIG. 3E illustrates an example record 380 for the set 300 after being processed by one or more systems and methods of the present disclosure, such as the conversion system 104 and/or the data processing unit 214, among other options. In this example, a set of micro-records 382 are generated based, at least in part, on the hierarchical and/or structural relationships of the set 300. For example, different micro-records of the set 382 may include a phrase or sentence that includes information obtained from evaluation of the set 300. In this example, sertraline is noted as being a type of selective serotonin reuptake inhibitor because, based on the set 300, sertraline is a descendant or grouped within that category. Additionally, when evaluating the set 300, it can also be recognized that sertraline is a type of antidepressant. Various embodiments of the present disclosure may include the generation of these micro-records as training data to pre-train one or more language models. These micro-records 382 provide plain language representations of the set 300 while maintaining the hierarchical information represented within the set 300. In this manner, data that has already been coded and established within relationships can be used for training purposes without losing the relational information.

Figure 4A:
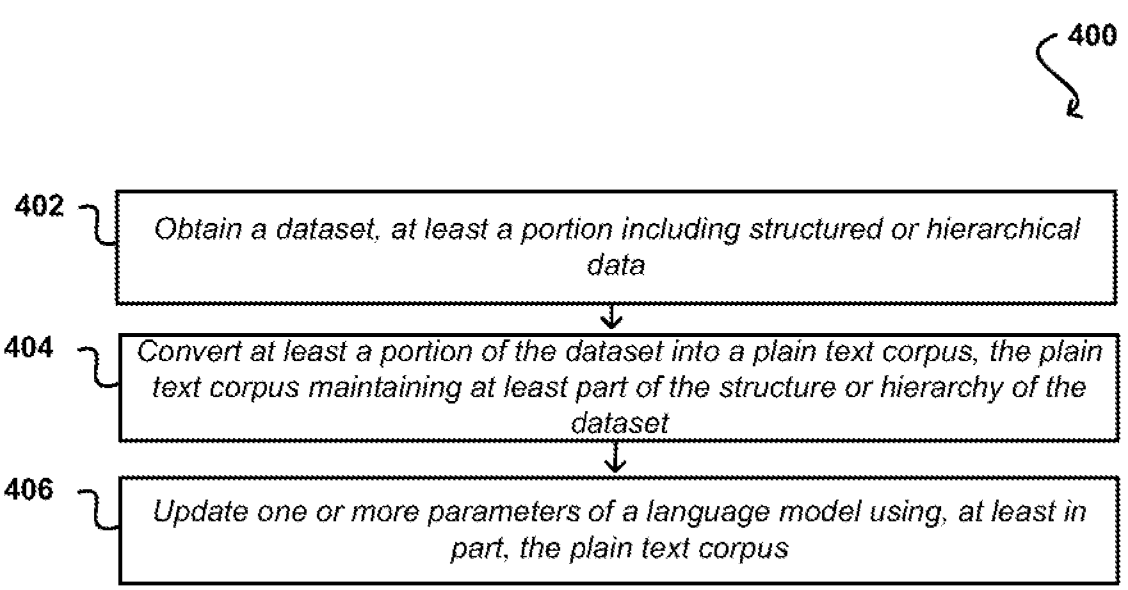
FIG. 4A illustrates an example flow chart for training a machine learning system, according to least one embodiment.

FIG. 4A illustrates an example process 400 for pre-training a language model on converted structural datasets. It should be understood that for this and other processes presented herein that there can be additional, fewer, or alternative steps performed in similar or alternative order, or at least partially in parallel, within the scope of various embodiments unless otherwise specifically stated. In this example, a dataset is obtained 402. The dataset may contain a plurality of data entries and may also include structured or hierarchical data, such as information from a relational database, table, or the like. It should be appreciated that various forms of structure within one or more text documents may also correspond to structured or hierarchical data. By way of example and without limitation, heads and subheadings, internal links within documents, and the like may be a form of structured data that may provide useful information regarding how information is related within a document.

In at least one embodiment, the dataset may be converted to plain text 404. In various embodiments, the plain text may also be preferred to as a plain text corpus. For example, as shown in FIGS. 3A-3E, information within the dataset may be extracted and then relationships within the dataset may be labeled or otherwise presented as plain text. Such conversion(s) may include removing the information from a table or a database and then linking or otherwise textually describing relationships between different information from the dataset. That is, the converted plain text corpus may include natural language representations of at least one relationships between two or more data centuries of the data entries forming the data set. In this manner, the dataset may be converted to a format that is useful for training machine learning systems.

The converted dataset, in the form of plain text (e.g., the plain text corpus), may be used to update one or more parameters of a language model 406. For example, the language model may execute in a training mode and receive the plain text corpus as an input. The information may be used to adjust various weighting parameters of the language model and/or to fine tune the language model for a particular domain. It should be appreciated that a variety of different domains may be pre-trained for a single language model, such an operation may lead to a language model that is larger and takes longer to execute inputs, and as a result, in various embodiments, language models may be pre-trained on specific domains for targeted tasks.

Figure 4B:
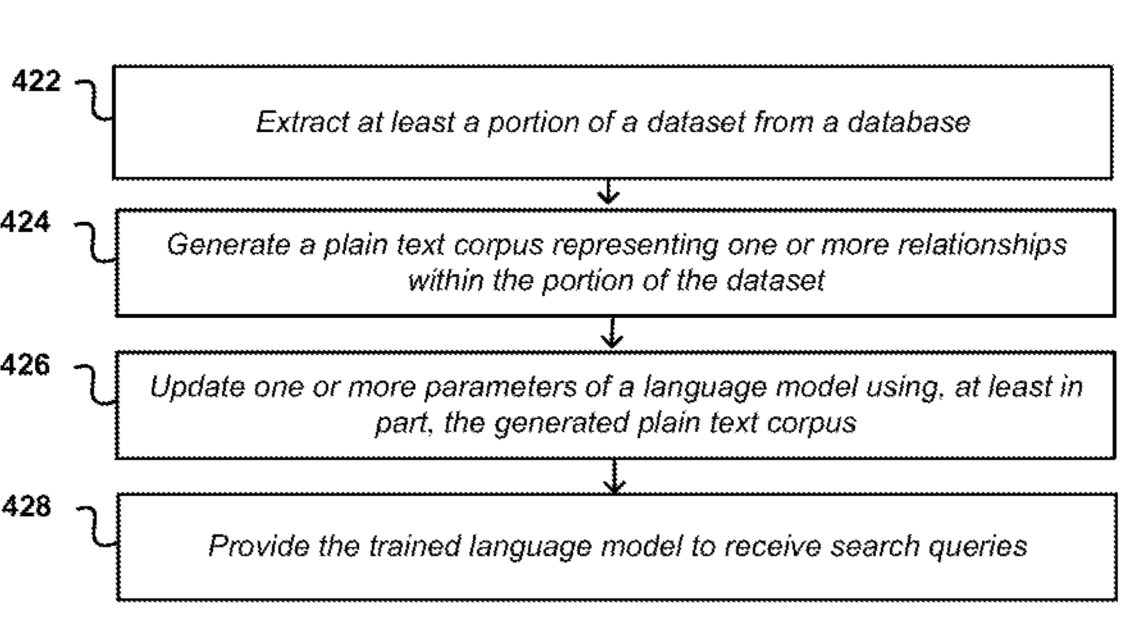
FIG. 4B illustrates an example flow chart for training and searching using a machine learning system, according to at least one embodiment.

FIG. 4B is a flow chart of an embodiment of a method 420 for training a language model to act as or supplement a search engine. In this example, at least a portion of a dataset is extracted from a database 422. The dataset may include information associated with one or more domains, where the domain may be a target domain for searching. Furthermore, as noted, the dataset may be formed, at least in part, by a plurality of data centuries, where at least one relationships exists between two or more data entries of the plurality of data entries.

Various embodiments include generating plain text (e.g., a plain text corpus), from the portion of the dataset, that maintains relationships within the portion of the dataset 424. For example, the plain text may write out different relationships between information within the dataset. The plain text may also include labels or other indicators that represent the relationships. In embodiments, the plain text may be used to provide a natural language representation of at least one relationships between two or more data entries of the dataset. Accordingly, the work and effort put into forming the relationships within the database is maintained when the dataset is used for training purposes, thereby providing richer information.

The generated plain text may be used to update one or more parameters of a language model 426, for example in a training or pre-training step. The language model may be an existing language model that is trained, generally, on a large dataset. However, in order to provide more accurate results for particular domains, the generated plain text may be used to pre-train or fine tune the language model to that domain. This trained language model may then be provided to receive search queries or as a supplement to an existing search engine 428. Accordingly, users may enter natural language search queries associated with the domain and, through the improvements provided by the pre-training process that uses the information with maintained structural relationships, novel findings may be extracted from the search domain.

Figure 5:
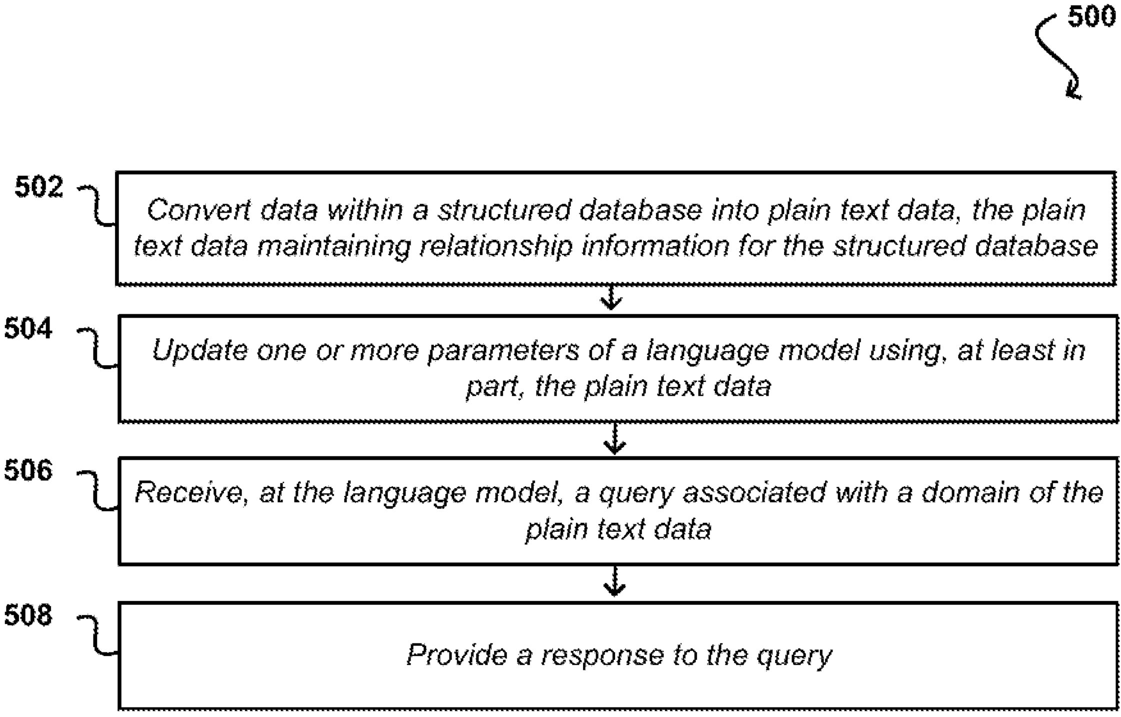
FIG. 5 illustrates an example flow chart for training and search using a machine learning system, according to at least one embodiment.

FIG. 5 is a flow chart of an embodiment of a method 500 for generating responses to input queries using a trained language model. In this example, data from a structured database is converted into plain text data 502. Conversion into the plain text may be formatted such that relationship information associated with the structured database is maintained, such as by providing micro-records about relationships, tags, or the like. In at least one embodiment, one or more parameters of a language model are updated, for example during pre-training or fine-tuning, using the plain text data 504. For example, one or more training operations may commence where different weight factors, among other features, of the language model are adjusted to correspond to a domain of the plain text data. It should be appreciated that the language model may be a general language model that is then trained for one or more specific domains, in various embodiments.

In at least one embodiment, the trained language model may then be utilized for search operations. For example, a query associated with the domain of the plain text data may be received at the language model 506. The language model may then process the query, such as by applying the query against a search domain corresponding to a third party search engine, among other options, to provide a response to the query 508. In at least one embodiment, the query may be evaluated and be determined to be associated with the domain of the plain text data. Additionally, in certain embodiments, at least one of the query or the response may be associated with a first data entry of two or more data entries forming the data of the structured database. The response may be generated based at least on the first data entry and the at least one plain text representation of the at least one relationship between the first data entry and another data entry of the two or more data entries In this manner, the language model may be used to improve or otherwise augment searching of various search domains to provide the benefit of the trained language model to the search.

Figure 6:
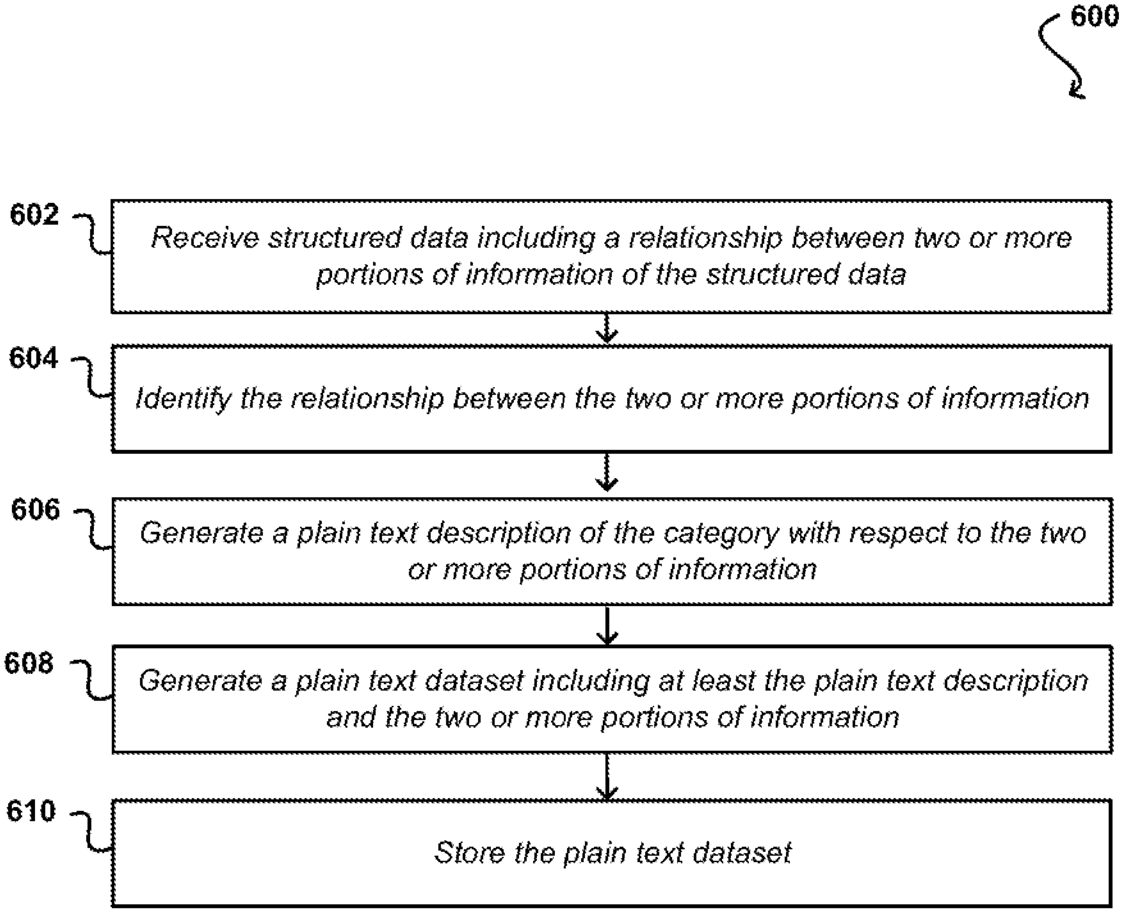
FIG. 6 illustrates an example flow chart for generating plain text datasets, according to at least one embodiment.

FIG. 6 is a flow chart of an embodiment of a method 600 for generating plain text datasets from structured data. In this example, structured data is received from a database 602. The structed data may include data that is formatted or otherwise arranged such that one or more relationships are represented between two or more portions of information in the structured data. For example, two or more portions of information may be categorized within a common family, such as a family of pharmaceutical compounds, among other options. The relationships between the two or more portions may be identified 604. For example, a hierarchical or relational relationship may be identified by evaluating the portions of information.

In at least one embodiment, a plain text description of the relationship is generated 606. For example, the plain text description may be a sentence describing the relationships, a label, a tag, or the like. Using at least the plain text description, a plain text dataset may be generated 608. The plain text dataset may include the plain text description and the two or more portions of information, along with additional information associated with the dataset. The plain text dataset may be stored 610, for example for use in training one or more machine learning systems.

DATA CENTER

Figure 7:
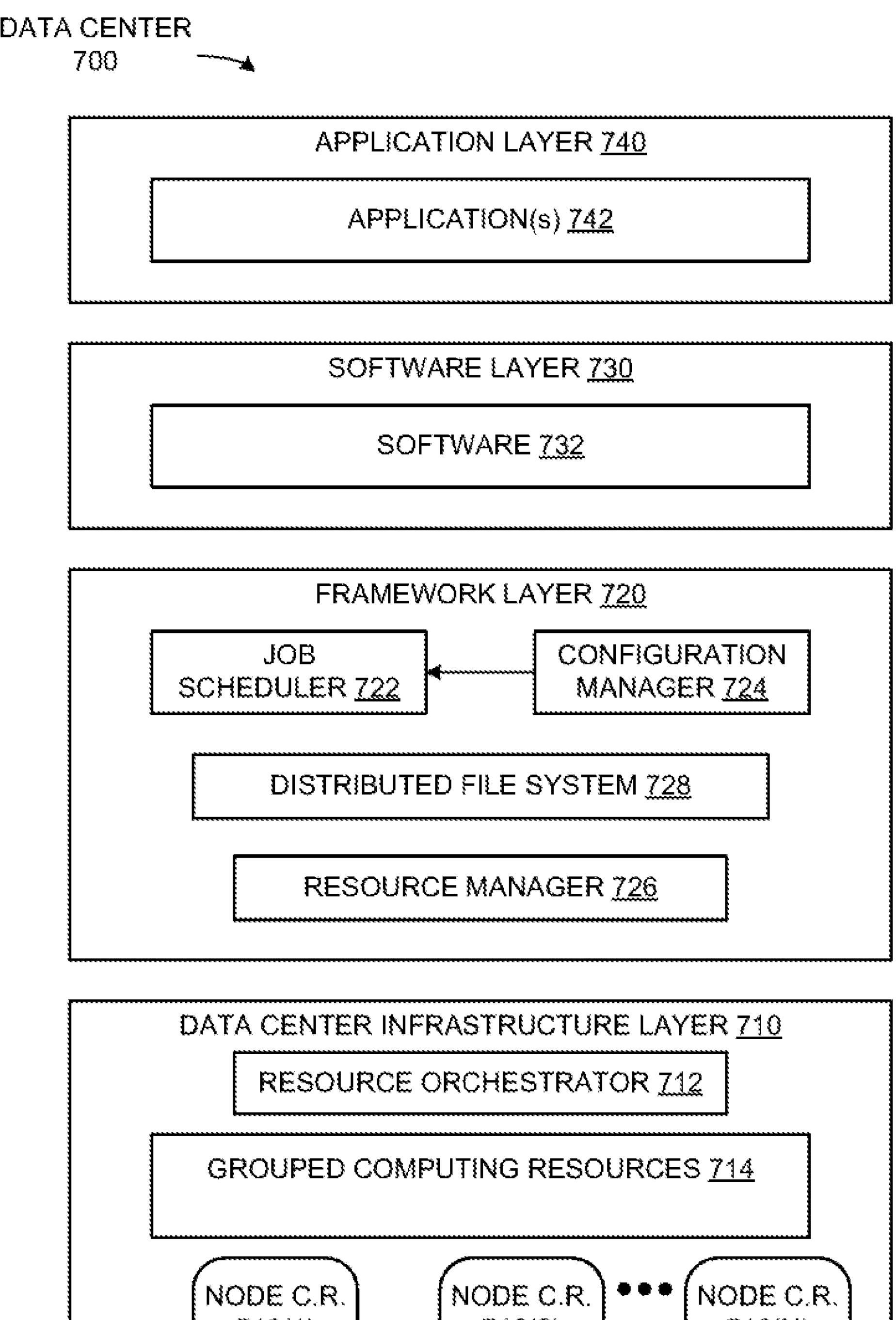
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for executing commands in interaction environments.

COMPUTER SYSTEMS

Figure 8:
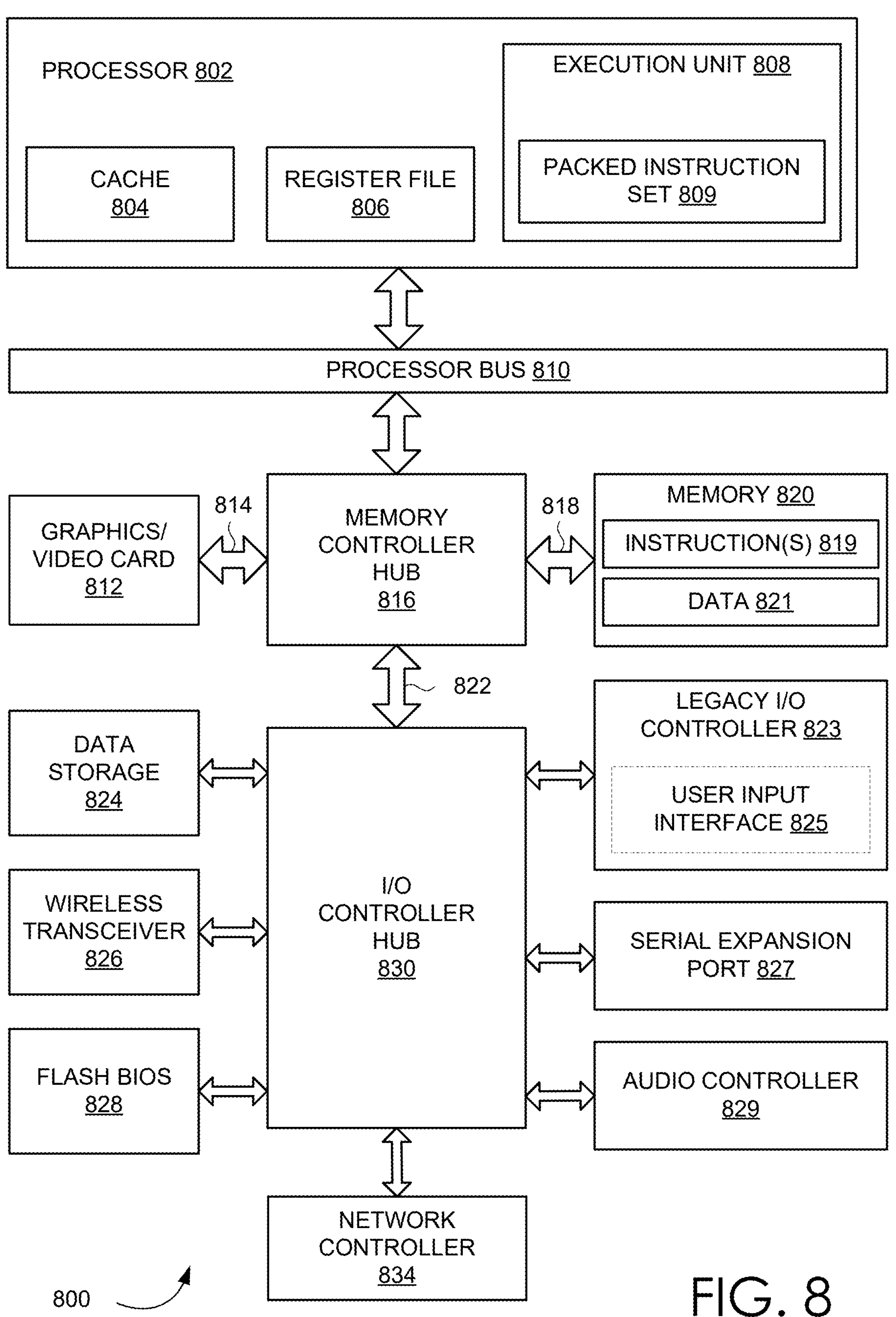
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

Embodiments of the systems and methods described herein may be used for a variety of purposes, by way of example and without limitation, for machine control, machine locomotion, machine driving, synthetic data generation, digital twinning, model training, perception, augmented reality, virtual reality, mixed reality, robotics, security and surveillance, autonomous or semi-autonomous machine applications, deep learning, environment simulation, data center processing, conversational AI, light transport simulation (e.g., ray-tracing, path tracing, etc.), collaborative content creation for 3D assets, cloud computing and/or any other suitable applications.

Disclosed embodiments may be incorporated or integrated in a variety of different systems such as automotive systems (e.g., a human-machine interface for an autonomous or semi-autonomous machine), systems implemented using a robot, aerial systems, medial systems, boating systems, smart area monitoring systems, systems for performing deep learning operations, systems for performing simulation and digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for executing commands in interaction environments.

Figure 9:
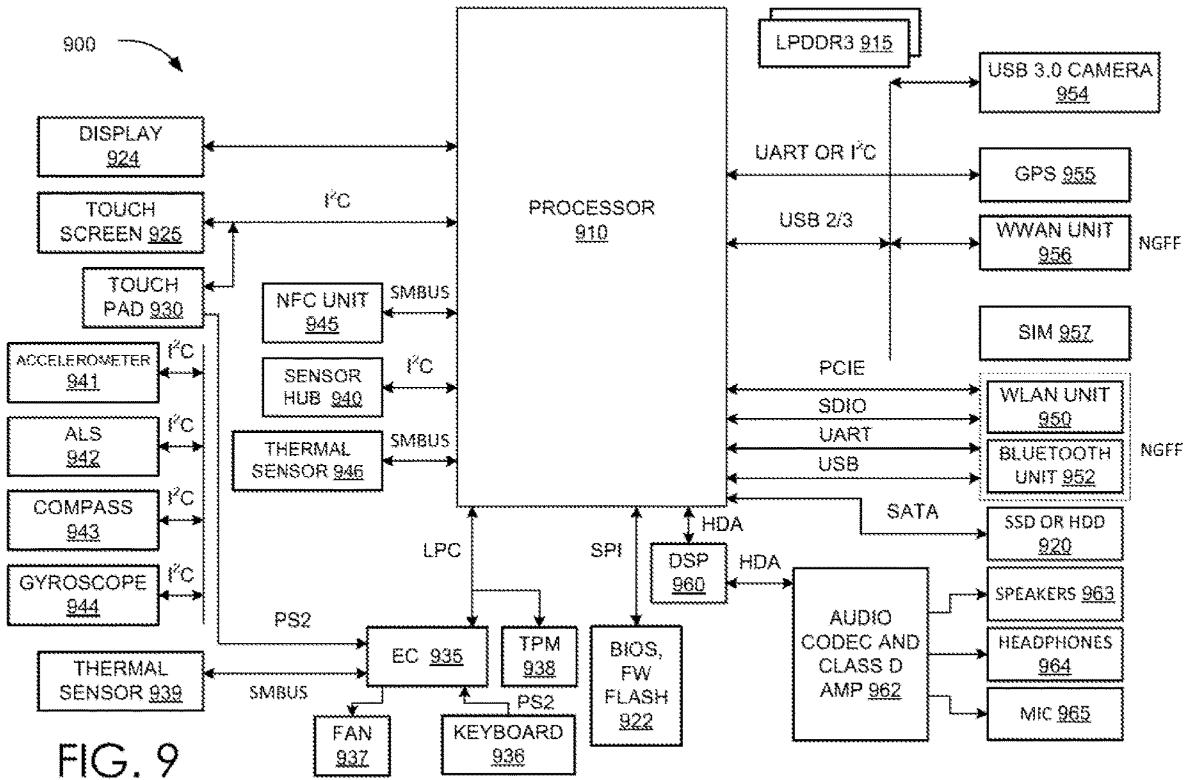
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for executing commands in interaction environments.

Figure 10:
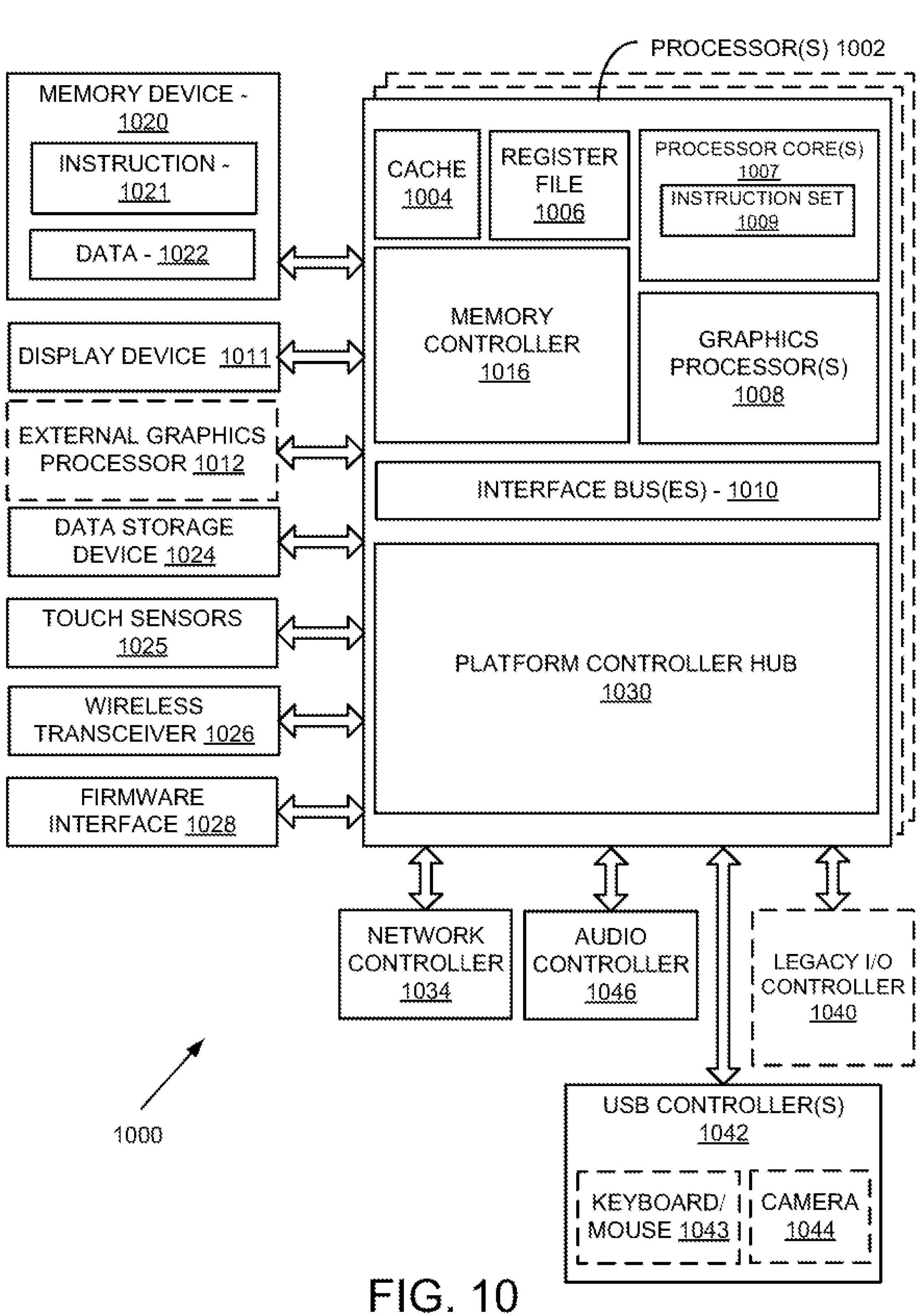
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for executing commands in interaction environments.

Figure 11:
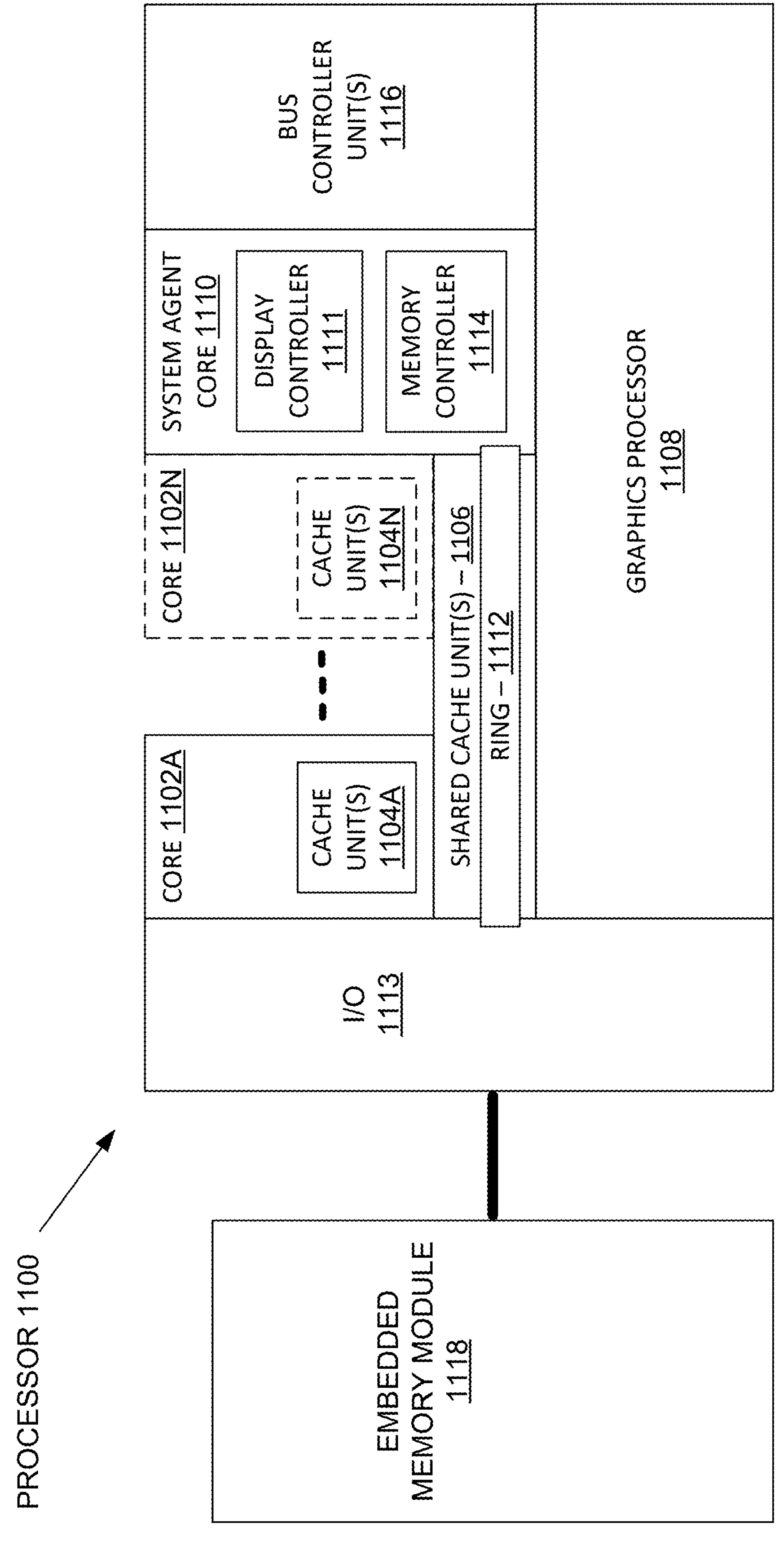
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for executing commands in interaction environments.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed.

No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:

automatically converting a plurality of data entries from a structured database into a plain text corpus according to one or more rules, the plain text corpus comprising at least one natural language representation of at least one structural relationship between two or more data entries of the plurality of data entries;

updating one or more parameters of a language model pre-trained without a particular domain using, at least in part, the converted plain text corpus including the at least one natural language representation of the at least one structural relationship input to the language model to adjust weight factors of the one or more parameters toward a domain corresponding to the converted plain text corpus by learning the at least one structural relationship for the language model using a neural network architecture;

receiving a query associated with the domain corresponding to the plain text corpus, the query corresponding to one or more additional databases to be searched including content related to the domain; and determining the query is associated with the domain corresponding to the converted plain text corpus;

responsive to the determining the query is associated with the domain, searching the one or more additional databases using the updated language model;

generating, based on the searching, a response to the query output from the updated language model, wherein the query comprises at least a portion of a first data entry of the two or more data entries, and wherein the response is generated based at least on the first data entry and based at least on a subset of the one or more parameters updated using the at least one plain text representation of the at least one structural relationship between the first data entry and another data entry of the two or more data entries.

2. The computer-implemented method of claim 1, wherein converting a plurality of data entries from a structured database into a plain text corpus further comprises generating the natural language representation of a relationship between two or more portions of the plain text corpus, the two or more portions of the plain text corpus corresponding to the two or more data entries from the structure database.

3. The computer-implemented method of claim 1, further comprising searching through a search domain, in response to receiving the query, the search domain associated with a search engine external to the language model.

4. The computer-implemented method of claim 1, wherein the query is a natural language query.

5. The computer-implemented method of claim 1, wherein the structured database is a non-plain text database.

6. The computer-implemented method of claim 5, wherein the structured database is a relational database.

7. The computer-implemented method of claim 1, further comprising:

determining a domain for a first structured database of a set of databases corresponds to a target domain, wherein converting the plurality of data entries comprises converting data extracted from the first structured database.

8. The computer-implemented method of claim 1, further comprising:

storing the plain text corpus using a data storage; and fine tuning the language model based, at least in part, on the plain text corpus from the data storage.

9. A system, comprising:

one or more processors to:

identify at least one association between information within a structured dataset, the association involving at least a portion of a structure of the information;

automatically process the information according to a set of instructions such that the at least one association involving at least the portion of the structure is maintained and the structure is removed;

generate, from the processed information, a training set for one or more domains, the training set including the at least one association involving at least the portion of the structure in natural language form;

receive an input query associated with the information, the query corresponding to one or more additional datasets to be searched including content related to the domain;

searching the one or more additional datasets based on the query using a language model associated with the input query, the language model at least partially trained using at least the training set including the at least one association involving at least the portion of the structure to adjust weight factors, for updating one or more parameters of the language model, toward the one or more domains by learning the at least one association for the language model using a neural network architecture; and generate, as an output from the language model based on the searching, a response to the input query.

10. The system of claim 9, wherein the association corresponds to at least one of a hierarchical or relational relationships of the structured dataset.

11. The system of claim 9, wherein the one or more processors are further to:

determine the structured dataset corresponds to a specified domain;

retrieve the structured dataset; and extract the information from the structured dataset.

12. The system of claim 9, wherein the one or more processors are further to execute a search for the input query against a search domain, the search domain associated with a search engine external to the language model.

13. The system of claim 9, wherein the input query is a natural language query processed by the language model.

14. The system of claim 9, wherein the information is converted into a sentence structure such that the at least one association is expressed using plain text.

15. The system of claim 9, wherein the one or more processors are further to pre-train the language model using at least a portion of the training set.

16. The system of claim 9, wherein the system is comprised in at least one of:

a human-machine interface system of an autonomous or semi-autonomous machine;

a system for performing conversational AI operations;

a system for performing simulation operations;

a system for performing digital twin operations;

a system for performing deep learning operations;

a system implemented using an edge device;

a system implemented using a robot;

a system incorporating one or more virtual machines (VMs);

a system implemented at least partially in a data center; or a system implemented at least partially using cloud computing resources.

17. A computer-implemented method, comprising:

identify at least one structural association between information within a structured dataset;

determine that one or more formats of the information including the at least one structural association are one of a plurality of suitable formats;

automatically process, based on the one or more formats, the information into a second format according to a set of instructions such that the at least one structural association is maintained and a related structure is removed; and generate, from the processed information in the second format, a training set associated with one or more domains for training a model to search one or more additional datasets including content related to the domain responsive to a query associated with the information by adjusting weight factors, for updating one or more parameters of the model, toward the one or more domains by learning the at least one structural association for the model using a neural network architecture, the training set including the at least one structural association in natural language form.

18. The computer-implemented method of claim 17, wherein at least a portion of the structure of the information is not suitable for training a machine learning model to generate a response to a query.

19. The computer-implemented method of claim 17, further comprising:

determining the structured dataset corresponds to a specified domain;

retrieving the structured dataset; and extracting the information from the structured dataset.

20. The computer-implemented method of claim 17, wherein the information is converted into a sentence structure such that the at least one association is expressed using plain text.

* * * * *